Dec. 26, 1961  E. N. COLE  3,014,730
MOTOR VEHICLE FUEL TANK INSTALLATION
Filed Oct. 1, 1959
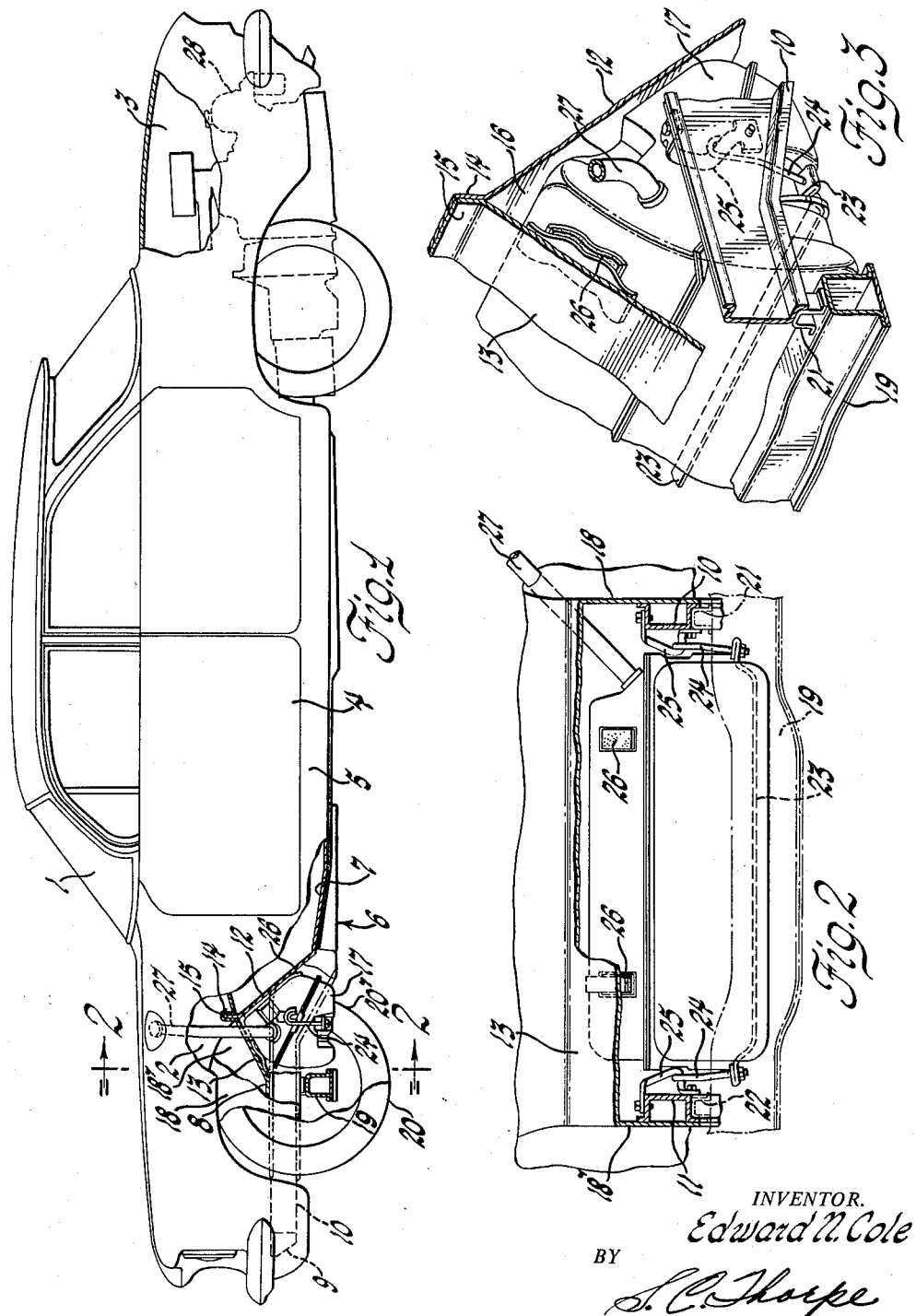
INVENTOR.
Edward N. Cole
BY
S. C. Thorpe
ATTORNEY

United States Patent Office 3,014,730
Patented Dec. 26, 1961

3,014,730
MOTOR VEHICLE FUEL TANK INSTALLATION
Edward N. Cole, Bloomfield Hills, Mich., assignor to General Motors Corporation, Detroit, Mich., a corporation of Delaware
Filed Oct. 1, 1959, Ser. No. 843,837
5 Claims. (Cl. 280—5)

This invention relates to automotive vehicles and particularly to an improved fuel tank installation for a rear-engine mounted automobile.

Whereas in more conventional front-engine mounted cars it is common practice to locate the engine fuel tank rearwardly of the passenger compartment and under the floor of the rear trunk or luggage compartment where there is generally adequate space provision as well as good protection for the tank, forward location for the tank is advantageous in cars having the engine mounted in the rear. While it is old to locate the tank forwardly of the passenger compartment, either within the forward luggage compartment which is usually provided on such rear-engine cars, or just forwardly of the dash and above the engine in a front-engine vehicle, the present invention provides a particularly unique arrangement of the vehicle body and framing structure having advantages in better isolation of the passenger and front luggage compartments from the tank in the event of collision, ample protection of the tank from road damage, better weight distribution, as well as more efficient utilization of space within the structural confines of the vehicle package.

In accordance with the invention the vehicle has its engine at the rear, and forwardly thereof is a chassis and body structure including an underbody which defines the floors of the passenger compartment and a forward luggage compartment. At the juncture of these compartment floors, the usual upwardly and forwardly inclined toe board joins with an upwardly and rearwardly inclined rear section of the luggage compartment floor to form a downwardly presenting, transversely extending recess into which is nested the fuel tank. The opposite ends of this recess are closed and reinforced by the front wheelhousing panels, and underlying and reinforcing the luggage and passenger compartment floors are longitudinal sill members which secure to and reinforce the lower extremities of the wheelhousing panels in further bracing the tank enclosure. Also, since this recess for the tank is located just rearwardly of the front wheel carrying cross member which underlies the luggage compartment floor, this cross member provides added frontal protection to the tank against damage from objects and irregularities in the road during vehicle operation.

The means by which these and other advantages and objects of the invention are attained will be more clearly understood from the following description of one specific embodiment thereof, having reference to the drawing, wherein:

FIGURE 1 is a side view of a rear-engine automotive vehicle, with portions broken away and in section to show the forward mounted fuel tank and the structural parts of the underbody and front cross member.

FIGURE 2 is an enlarged fragmentary transverse sectional view taken substantially on the line 2—2 of FIGURE 1.

FIGURE 3 is a further enlarged fragmentary perspective view of the fuel tank installation, as seen from a point forwardly and to the left side thereof.

Referring now in detail to the drawing, an automobile 1 of generally conventional external appearance is shown having a forwardly disposed luggage compartment 2, rear engine compartment 3, and the passenger compartment 4 intermediate thereof. A unit chassis and body structure 5 is employed, including an underbody designated generally by the numeral 6 which forms a floor 7 for the passenger compartment and a floor 8 for the forward luggage compartment. Also shown as part of this underbody is a transverse reinforcement bar 9 for the front end of the luggage compartment floor 8 and a pair of longitudinal reinforcing sill members 10 and 11 which extend rearwardly from the bar 9 and underlie the luggage compartment floor and a portion of the passenger compartment floor 7. The passenger compartment floor 7 terminates forwardly with an upwardly inclined toe board 12, and the luggage compartment floor 8 terminates rearwardly with an upwardly inclined portion 13. These oppositely inclined floor portions, whose upper extremities 14, 15 are secured together, define a downwardly open recess 16 housing the fuel tank 17. As best shown in FIGURE 2, the unit chassis and body structure also includes front wheelhousing panels 18 and 18' which serve to close the ends of the recess 16, being secured to the lateral extremities of the toe board 12 and luggage compartment floor portion 13. The lower extremities of these wheelhousing panels are, in turn, reinforced by the longitudinal sill members 10, 11.

In the construction shown, the luggage compartment floor 8 is at a substantially higher elevation than the passenger compartment floor 7. Underlying the luggage compartment just forwardly of the tank 17 and below the sill members 10, 11 is a front cross member 19 which (through suitable spring suspension means not shown) carries the front wheels 20, 20' of the vehicle. This cross member 19 which is secured to the sill members 10, 11 by suitable means such as the brackets 21, 22 thus complements the rearwardly and upwardly inclined floor portion 13 in providing frontal protection for the tank 17 against damage from road objects and irregularities during vehicle operations. The tank is secured in place within the recess 16 by a conventional strap 23 extending transversely under the tank and hooked at each end to one of the sill members 10, 11 by conventional rods 24 and brackets 25. Resilient pads 26 are shown spacing the upper walls of the tank 17 from the toe board 12 and wall portion 13. At 27 is shown the tank filler pipe which extends upwardly for access through the upper portion of one wheelhousing 18.

The fuel tank is thus not only well protected from external damage and isolated from heat generated by the engine 28 in the rear compartment 3, but its location within the rigid hollow cross beam formed around it by the underbody structure fully isolates the passenger compartment 4 and the front luggage compartment 2 from gasoline fumes and possible fire in event the tank is ruptured in a collision. In addition, the relatively low position of the tank and its forward location contributes to lowering the center of gravity and proper fore and aft proportioning of the weight of the vehicle.

While only a single preferred embodiment of the invention has been disclosed, it is appreciated that numerous minor changes in the construction and arrangement of the parts may be made without departing from the spirit and scope of the invention as defined in the following claims.

I claim:

1. In a rear engine mounted automotive vehicle having a pair of front road wheels, a unit chassis frame and body structure defining a passenger compartment intermediate the ends of the vehicle and rearwardly of the front wheels and a luggage compartment extending forwardly of the front wheels from the passenger compartment, said structure including a luggage compartment floor, a passenger compartment floor and a pair of transversely spaced longitudinal sill members underlying and reinforcing said floors, said passenger compartment floor having an upwardly inclined toe board portion at its front end, said luggage compartment floor having a portion at its rear end inclined upwardly opposite said toe board portion and defining therewith a generally V-shaped downwardly open recess extending rearwardly from the axis of the front wheels, and a generally V-shaped fuel tank nested within said recess and between said sill members.

2. The invention of claim 1, wherein said vehicle has a front wheel carrying cross member secured to said sills and extending under said luggage compartment floor adjacent the forward extremities of said fuel tank, the bottom extremities of said cross member, fuel tank and passenger compartment floor being substantially flush with each other.

3. In a rear engine mounted automotive vehicle having a pair of front road wheels, a unit chassis frame and underbody structure including a passenger compartment floor terminating forwardly with an upwardly inclined toe board, a luggage compartment floor forward of said passenger compartment floor and terminating rearwardly with a portion inclined upwardly opposite said toe board, said toe board and luggage compartment floor portion being secured together at their upper ends and defining a downwardly open recess therebetween extending rearwardly from the axis of the front wheels, wheel-housing panels closing the ends of said recess and secured to the lateral extremities of said toe board and luggage compartment floor, and a pair of longitudinal sill members underlying and reinforcing said luggage compartment floor forwardly of said recess and said passenger compartment floor, said sill member being also secured to and reinforcing the lower extremities of said wheelhousing panels at the ends of said recess, a fuel tank for said vehicle disposed in said recess, and supporting means for said tank secured at each end of said recess to the adjacent sill member.

4. The invention of claim 3, together with a front wheel carrying cross member extending under said luggage compartment floor forwardly adjacent said recess and complementing said luggage compartment floor portion in providing frontal protection to the tank.

5. In an automobile having a pair of front road wheels, a forward luggage compartment, a rearward engine compartment and a passenger compartment intermediate said first named compartments, a unit chassis and underbody structure including a floor for said passenger compartment, a floor for said luggage compartment, a cross member extending between said wheels and under said luggage compartment floor and a pair of transversely spaced apart longitudinal sill members underlying said luggage compartment floor and terminating under said passenger compartment floor, said luggage compartment floor being at a substantially higher elevation than said passenger compartment floor, each of said floors having a portion adjacent the other inclined upwardly to form a generally V-shaped recess extending rearwardly from said cross member, an engine in said engine compartment, a generally V-shaped fuel supply tank for said engine extending nestably into said recess, and wheel housing panels secured to the lateral extremities of said floor portions and to said sill members, said cross member underlying and being secured to said sill members, said cross member and tank having their lower extremities substantially flush with the passenger compartment floor, whereby the fuel tank is effectively protected from frontal and rearward damage by road objects and irregularities during vehicle operation and is isolated by the underbody from the passenger and luggage compartments.

References Cited in the file of this patent
UNITED STATES PATENTS

| | | |
|---|---|---|
| 1,158,602 | Watts et al. | Nov. 2, 1915 |
| 1,454,597 | Belden | May 8, 1923 |
| 2,190,227 | Best | Feb. 13, 1940 |
| 2,733,096 | Waterhouse et al. | Jan. 31, 1956 |
| 2,822,056 | Muller | Feb. 4, 1958 |

FOREIGN PATENTS

| | | |
|---|---|---|
| 993,057 | France | July 18, 1951 |